United States Patent
Imms et al.

(10) Patent No.: US 12,360,788 B2
(45) Date of Patent: *Jul. 15, 2025

(54) PROVIDING CONTEXTUAL ACTIONS IN COMMAND LINE INTERFACES

(71) Applicant: Microsoft Technology Licensing, LLC, Redmond, WA (US)

(72) Inventors: Daniel John Imms, Bothell, WA (US); Megan Moriarity Rogge, Inlet Beach, FL (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/663,378

(22) Filed: May 14, 2024

(65) Prior Publication Data

US 2024/0296059 A1 Sep. 5, 2024

Related U.S. Application Data

(63) Continuation of application No. 17/704,192, filed on Mar. 25, 2022, now Pat. No. 12,014,194.

(51) Int. Cl.
*G06F 9/451* (2018.01)
*G06F 9/455* (2018.01)

(52) U.S. Cl.
CPC .......... *G06F 9/453* (2018.02); *G06F 9/45512* (2013.01)

(58) Field of Classification Search
CPC .. G06F 9/453; G06F 9/45512; G06F 3/04817; G06F 3/0482; G06F 3/0484; G06F 3/04842; G06F 3/04845; G06F 3/04895; G06F 3/04897
See application file for complete search history.

(56) References Cited

U.S. PATENT DOCUMENTS

| | | | | |
|---|---|---|---|---|
| 7,627,833 | B2* | 12/2009 | McKnight | G06F 9/45512 715/810 |
| 2014/0325425 | A1* | 10/2014 | Milam | G06F 3/0482 715/777 |
| 2015/0067640 | A1* | 3/2015 | Booker | G06F 8/33 717/109 |

* cited by examiner

*Primary Examiner* — Rami R Okasha
(74) *Attorney, Agent, or Firm* — Workman Nydegger

(57) ABSTRACT

Techniques for expanding capabilities of a computing shell, which exposes services provided by an OS and which is separated from a kernel of the OS, by enabling a command line interface (CLI) of the shell to have context aware capabilities. An event in which a command is entered in the CLI is detected. The CLI displays a command decoration that is selectable and that, when selected, triggers display of a menu comprising a command suggestion. The command suggestion is generated based on a context associated with the command. In response to selection of the command decoration, the menu is displayed. This menu includes the command suggestion. In response to selection of the command suggestion, the computing shell automatically executes the command suggestion.

20 Claims, 14 Drawing Sheets

```
C:\Windows\System32\cmd.exe

Microsoft Windows [Version 10.0.10240]
(c) 2022 Microsoft Corporation. All rights reserved microsoft\vscode
> gti checkout
gti: The term 'gti' is not recognized as a name of a cmdlet, function, script file, or
executable program.
Check the spelling of the name, or if a path was included, verify that the path is correct
and try again.
```

Output 600

*Figure 6*

```
C:\Windows\System32\cmd.exe

Microsoft Windows [Version 10.0.10240]
(c) 2022 Microsoft Corporation. All rights reserved microsoft\vscode
> gti checkout
gti: The term 'gti' is not recognized as a name of a cmdlet, function, script file, or
executable program.
Check the spelling of the name, or if a path was included, verify that the path is correct
and try again.

> □
┌─────────────────┐
│ Rerun with "git"│
└─────────────────┘
         ↖ Selection
            1000
```

*Figure 10*

```
C:\Windows\System32\cmd.exe

Microsoft Windows [Version 10.0.10240]
(c) 2022 Microsoft Corporation. All rights reserved microsoft\vscode
> gti checkout
gti: The term 'gti' is not recognized as a name of a cmdlet, function, script file, or
executable program.
Check the spelling of the name, or if a path was included, verify that the path is correct
and try again.

microsoft\vscode
> git checkout
```

Output
1100

*Figure 11*

```
C:\Windows\System32\cmd.exe

Microsoft Windows [Version 10.0.10240]
(c) 2022 Microsoft Corporation. All rights reserved microsoft\vscode
> gti checkout
gti: The term 'gti' is not recognized as a name of a cmdlet, function, script file, or
executable program.
Check the spelling of the name, or if a path was included, verify that the path is correct
and try again.

microsoft\vscode
> git checkout
```

Populate 1200

*Figure 12*

PROVIDING CONTEXTUAL ACTIONS IN COMMAND LINE INTERFACES

CROSS-REFERENCE TO RELATED APPLICATIONS

This application claims the benefit of and priority to U.S. patent application Ser. No. 17/704,192 filed on Mar. 25, 2022 and entitled "PROVIDING CONTEXTUAL ACTIONS IN COMMAND LINE INTERFACES," which application is expressly incorporated herein by reference in its entirety.

BACKGROUND

Various tools are available for developers to generate, build, and execute code. One such example is referred to as an integrated development environment (IDE). An IDE is a program that provides a common graphical user interface (GUI) to enable developers to build applications. IDEs typically include a source code editor, a local build automation engine, and a debugger.

The source code editor is a type of text editor that can be used to write software code. The IDE includes functionality to enable the source code editor to be aware of "context." Programming "context" generally refers to information that is retained in order to enable a program or a task to be temporarily interrupted and to then later be continued from that point where it was interrupted. Context can also include environment conditions associated with a program, such as that program's variables, values for the variables, working directories, and so on. Indeed, the term "context" can include a plethora of information. An IDE is able to maintain the context for an application and provide useful suggestions to developers when programming in an IDE. As an example, an IDE can use the context of a program to provide autocomplete suggestions while a developer is programming. The source code editor provides the developers with complete read and write control at any location or line within the source code. As an example, suppose a program includes hundreds of lines of source code. The developer can use the source code editor to manipulate or edit any line of code he/she chooses.

The local build automation engine includes a utility that enables the IDE to create a local build of an application. As an example, the local build automation engine can compile source code into executable code.

The debugger is a utility that helps developers identify bugs in their programs. This utility typically includes the ability to run various tests to identify any coding errors.

Although IDEs provide many benefits, developers often use other tools when interacting with a computer system. What is needed, therefore, is an improved technique for enabling other programs to have expanded capabilities.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices, and methods for expanding capabilities of a computing shell, which exposes services provided by an operating system (OS) and which is separated from a kernel of the OS, by enabling a command line interface (CLI) of the shell to have context aware capabilities.

Some embodiments detect an event in which a command is entered in the CLI. After detecting the event, the embodiments display, within the CLI, a command decoration that is selectable and that, when selected, triggers display of a menu comprising one or more command suggestions that are recognized by the computing shell. Each command suggestion included among the one or more command suggestions is generated based on a context associated with the command. The embodiments detect, within the CLI, a first selection of the command decoration. In response to the first selection of the command decoration, the embodiments display the menu, which includes the one or more command suggestions. Each command suggestion included among the one or more command suggestions is selectable within the menu. In response to a second selection of a particular command suggestion that was displayed in the menu, the embodiments cause the computing shell to automatically execute the particular command suggestion. Alternatively, the embodiments cause the particular command suggestion to be automatically entered into the CLI but refrain, at least temporarily, from causing the particular command suggestion to be executed by the computing shell.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 6 illustrates some example outputs that can be generated when the mistyped command is attempted to be executed.

FIG. 10 illustrates how the command suggestions in the menu are selectable using a cursor.

FIG. 11 illustrates one example scenario where, as a result of selecting a particular command suggestion, the shell automatically executes a command that was included in the command suggestion.

FIG. 12 illustrates an example scenario where, as a result of selecting a particular command suggestion, the CLI is automatically populated with a command that was included in the command suggestion, but the shell refrains, at least temporarily, from executing that command.

DETAILED DESCRIPTION

Embodiments disclosed herein relate to systems, devices, and methods for expanding capabilities of a computing shell, which exposes services provided by an operating system (OS) and which is separated from a kernel of the OS, by enabling a command line interface (CLI) of the shell to have context aware capabilities.

Some embodiments detect an event in which a command is entered in the CLI. After detecting the event, the embodiments display, within the CLI, a command decoration that is selectable and that, when selected, triggers display of a menu comprising one or more command suggestions that are recognized by the computing shell. Each command suggestion is generated based on a context associated with the command. The embodiments detect, within the CLI, a first selection of the command decoration. In response to the first selection, the embodiments display the menu, which includes the one or more command suggestions. Each command suggestion is selectable within the menu. In response to a second selection of a particular command suggestion that was displayed in the menu, the embodiments cause the computing shell to automatically execute the particular command suggestion. Alternatively, the embodiments cause the particular command suggestion to be automatically entered into the CLI but refrain, at least temporarily, from causing the particular command suggestion to be executed by the computing shell. Notably, the disclosed "suggestions" are not limited to running commands in the shell; rather, these are just some examples. The disclosed embodiments, as will be discussed in more detail later, can also perform other actions, such as cleaning up ports with the terminal before running a command again.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments bring about numerous benefits, advantages, and practical applications. As one example, the embodiments can be used to beneficially educate users on which commands can be used to perform various operations. As another example, the embodiments significantly improve human-computer interactions in that the embodiments help developers efficiently and quickly adopt specific CLI command segments. The embodiments can also be used to ensure that consistent CLI commands are used during the programming process. In some cases, the embodiments can also improve the operational efficiency of a computer by ensuring that correct CLI commands are being executed instead of using resources to attempt to execute improper CLI commands. Accordingly, these and numerous other benefits will now be described throughout the remaining portions of this disclosure.

Example Architectures

Figure 1:
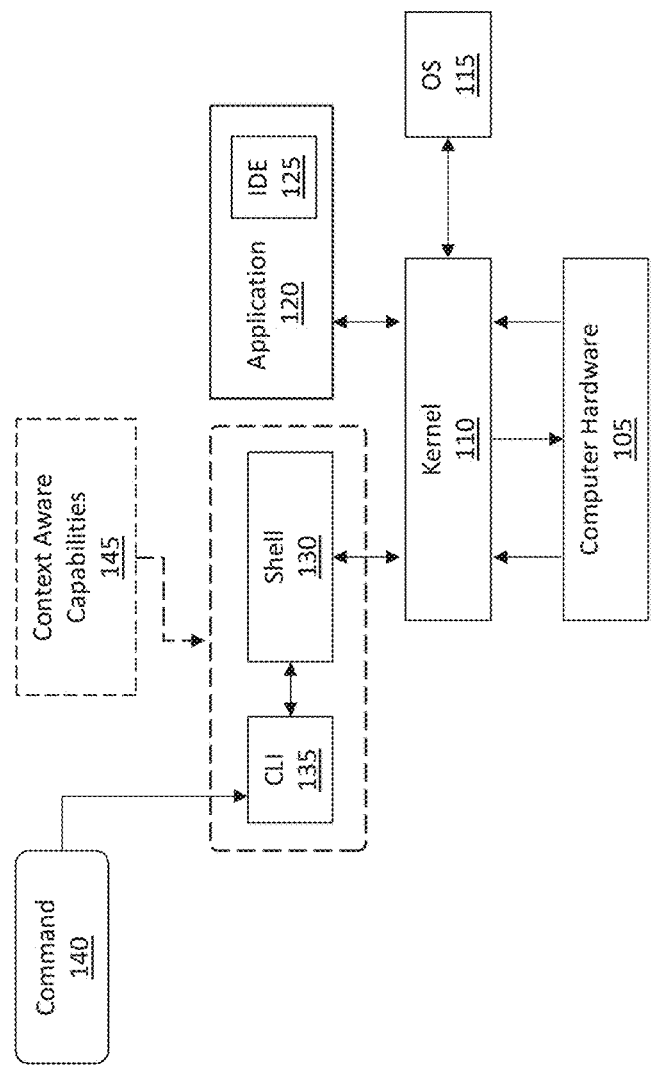
FIG. 1 illustrates an example architecture in which a command line interface (CLI) is provided with enhanced capabilities, including context aware capabilities.

Attention will now be directed to FIG. 1, which shows an example architecture 100 that can be used to provide the benefits recited earlier. Architecture 100 is a computing architecture that includes computer hardware 105. The computing hardware 105 can include any type of computing hardware, such as memory, one or more processors, and so on, without limit.

The architecture 100 also includes a kernel 110, which is the core of the computer's operating system 115. The kernel 110 is typically configured to have complete control over everything that uses the hardware 105. The kernel 110 manages all of the interactions between the computer's hardware and software, typically via the use of drivers.

Various applications 120 are able to interact with the kernel 110 to perform their respective processes. One example of an application is an IDE 125, which was described in more detail previously.

Another component is also able to interact with the kernel 110, but that entity is separate from the kernel 110. This entity is a shell 130 (aka "computing shell"). The shell 130 is a type of computer program or application that enables the display of an interface (e.g., a GUI or a command line interface (CLI) 135). Through the CLI 135, the shell 130 allows a user to control the operations of the computer via entered keyboard commands. The shell 130 exposes the OS's services and features to the user of the CLI 135, and the shell 130 is often viewed as being the outermost layer of the computer's OS. Examples of the shell 130 include, but are not limited to, a command prompt (e.g., cmd.exe), a PowerShell, csh (which launches the C shell), sh (which launches the Bourne shell), ksh (which launches the Korn shell), tcsh (is a shell similar to the C shell), bash, zsh, and fish.

The CLI 135 is a text-based user interface that enables users to use the shell 130 to perform various computing operations. The software that interprets and handles the commands entered in the CLI 135 is the command language interpreter, which is the shell 130. The shell 130 and the CLI 135 are distinct from an IDE 125 for the reasons listed above as well as the following reasons.

To illustrate, in some cases, the CLI 135 of the shell 130 is a Windows OS command prompt, a POSIX terminal, or a POSIX shell. In some cases, the CLI 135 of the shell 130 allows for new text to be entered only at a tail end of the CLI 135 (which is not the case in an IDE). Notably, the CLI 135 of the shell 130 is not a traditional text editor in which text can be entered or manipulated anywhere in the editor (as is the case with an IDE).

When a CLI 135 is first opened, the CLI displays a window that includes a command prompt, where users can enter commands. Different types of commands can be entered by the user. As examples only, the commands can include system commands, executable programs, and batch programs.

The system commands include commands that are encoded as a part of the computer's OS. The executable programs are commands that run text-based or perhaps graphical applications. The batch programs are text files that include various sequences of commands. Batch programs can include executable programs as well as system commands.

The CLI 135 further enables users to have scripting capabilities, where programs can be run on the computer from the command line. The CLI 135 also provides for setting system variables, for recalling previous commands that were issued (i.e. command history), and for performing command pipes (i.e. directing the output of a particular program to be the input of another program).

Some commands can be run by themselves without additional input. As an example, the "dir" command (e.g., C:\>dir) command is one such command. On the other hand, some commands include parameters (aka arguments or attributes), which operate to modify how a command behaves. As an example, the "cd" command (e.g., cd \documents\user) is a command that changes the working directory to a new directory specified in the parameters (e.g., from whatever was the previous directory to now being the "documents\user" directory).

When entering commands in the CLI 135, new commands are entered at the trailing end of the CLI window. That is, in contrast with a text editor used by the IDE 125 to enter or manipulate code, the CLI 135 is structured to always receive new commands at the trailing end of the CLI's window. Examples of this feature will be described later. Accordingly, users are able to enter commands, as shown by command 140, into the CLI 135, and the shell 130 then operates with the kernel 110 and the computer hardware 105 to execute those commands.

In accordance with the disclosed principles, the embodiments are configured to expand the capabilities of the shell 130 and the CLI 135 by enabling the shell 135 and the CLI 135 to have context awareness, as shown by context aware capabilities 145. Generally, the embodiments provide contextual actions via a command decoration (e.g., perhaps a lightbulb indicator). Providing this contextual awareness within a CLI (aka a "terminal") can be performed by scanning the contents of the terminal to provide useful actions. One example contextual action is to automatically detect phrases such as the following: >command 'ech' not found, did you mean 'echo'?<. Of course, other examples can be used as well. This disclosure will describe multiple different scenarios in how a CLI/shell can be made to be contextually aware.

The embodiments can also provide an action in a so-called "command decoration" and a corresponding "menu" to automatically replace "ech" with "echo". Since many users are familiar with an editor feature, those users can quickly action this by hitting "ctrl+." and then enter (or some other set of hotkeys). In some cases, replacement commands can be automatically executed.

Figure 2:
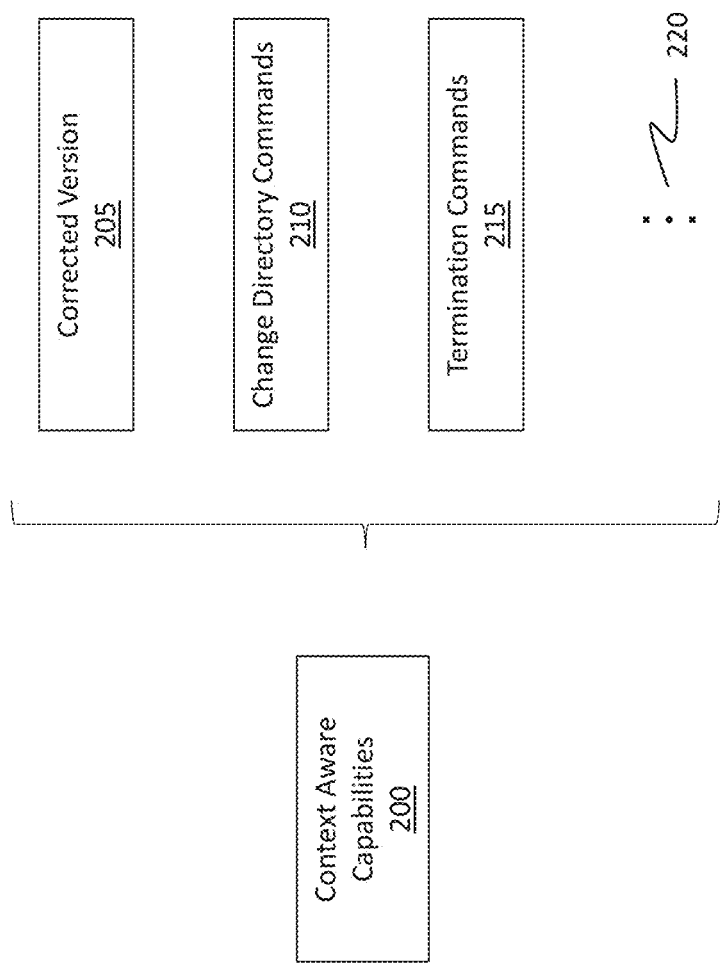
FIG. 2 illustrates some of the various functions that are included in being contextually aware.

FIG. 2 shows some additional examples of context aware capabilities 200. The above example was one type of example within the corrected version 205 subset of examples. The embodiments can analyze the command the user entered and determine whether the user meant to enter a different command. For instance, if the user mistyped a command, then the embodiments can propose a corrected version (e.g., a correctly typed version) of that command. Similarly, if the user mistyped a parameter or should have used a different parameter than the one that was typed (e.g., perhaps a particular command accepts only a specific type of parameter), then the embodiments can propose an alternative.

Another context aware capability includes the capability of recommending a user to use a set of change directory commands 210. For instance, it is often the case that during the programming process, users inadvertently fail to change directories. The embodiments are able to monitor the directories that are used by a user and submit recommendations for when a directory should be changed.

Another context aware capability includes the capability of recommending a user to use a set of termination commands 215. For instance, the termination commands 215 can include commands to terminate the usage of a particular port that should be closed. Of course, other termination operations can be used as well, such as to terminate various processes or tasks.

The ellipsis 220 illustrates how other capabilities can be included in the context aware capabilities 200. Furthermore, these capabilities are not limited to a single command being proposed by the embodiments. Indeed, the embodiments can propose multiple sets of commands that can be executed in sequence in order to perform a desired operation. Additionally, multiple different sets of proposals can be provided, and a user can optionally select whichever set of commands he/she would like to execute. Further details on all of these features will be provided throughout the remaining portions of this disclosure. Beneficially, however, the embodiments are now able to expand the capabilities of a CLI/shell by enabling the CLI/shell to be contextually aware of conditions that are present on the computer system and/or even conditions associated with a particular user.

Example Scenarios of Contextual Awareness

Figure 3:
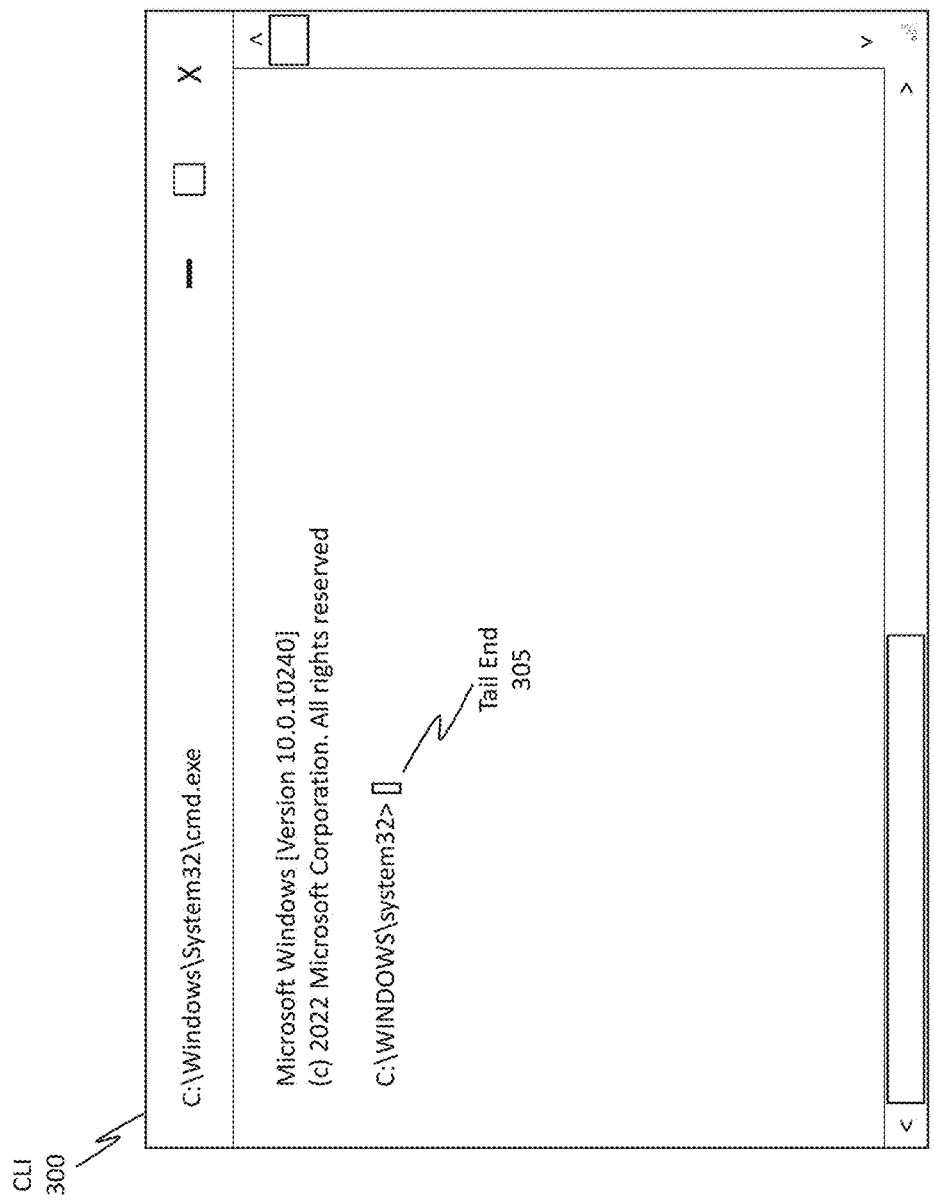
FIG. 3 illustrates an example CLI.

FIGS. 3 through 12 provide various depictions of CLIs and how those CLIs (and corresponding shells) can now have contextual awareness capabilities, as discussed in FIGS. 1 and 2. FIG. 3 shows an example CLI 300, which is representative of the CLI 135 from FIG. 1. Notice, in contrast to an IDE, commands can be entered only at the tail end 305 of the CLI 300, as opposed to commands capable of being entered anywhere in the IDE's text editor.

Figure 4:
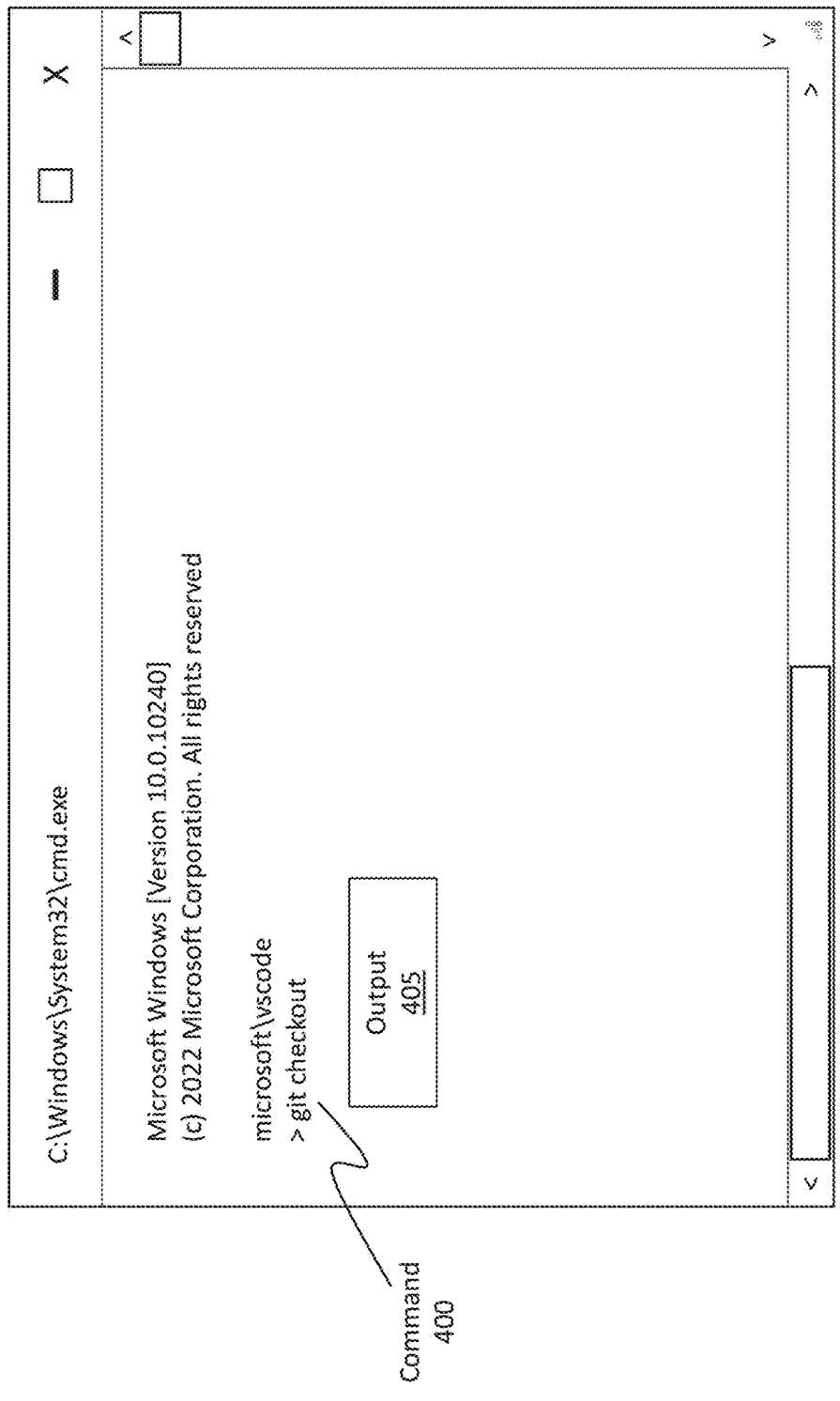
FIG. 4 illustrates how a command that is entered in the CLI and that is executed by the shell results in the generation and display of output.

In the scenario shown in FIG. 4, a user has entered a command 400 (e.g., "git checkout") in the CLI, and the shell has executed that command to produce output 405, which is also displayed at the tail end of the window. The embodiments are able to detect an event 410 in which a command has been entered into the CLI. In some cases, the embodiments also detect an event when the output 405 is generated and displayed in the CLI. Accordingly, the disclosed principles can be triggered at different times. These times include a time while the user is entering a command in the CLI and/or a time when the output 405 is displayed.

Figure 5:
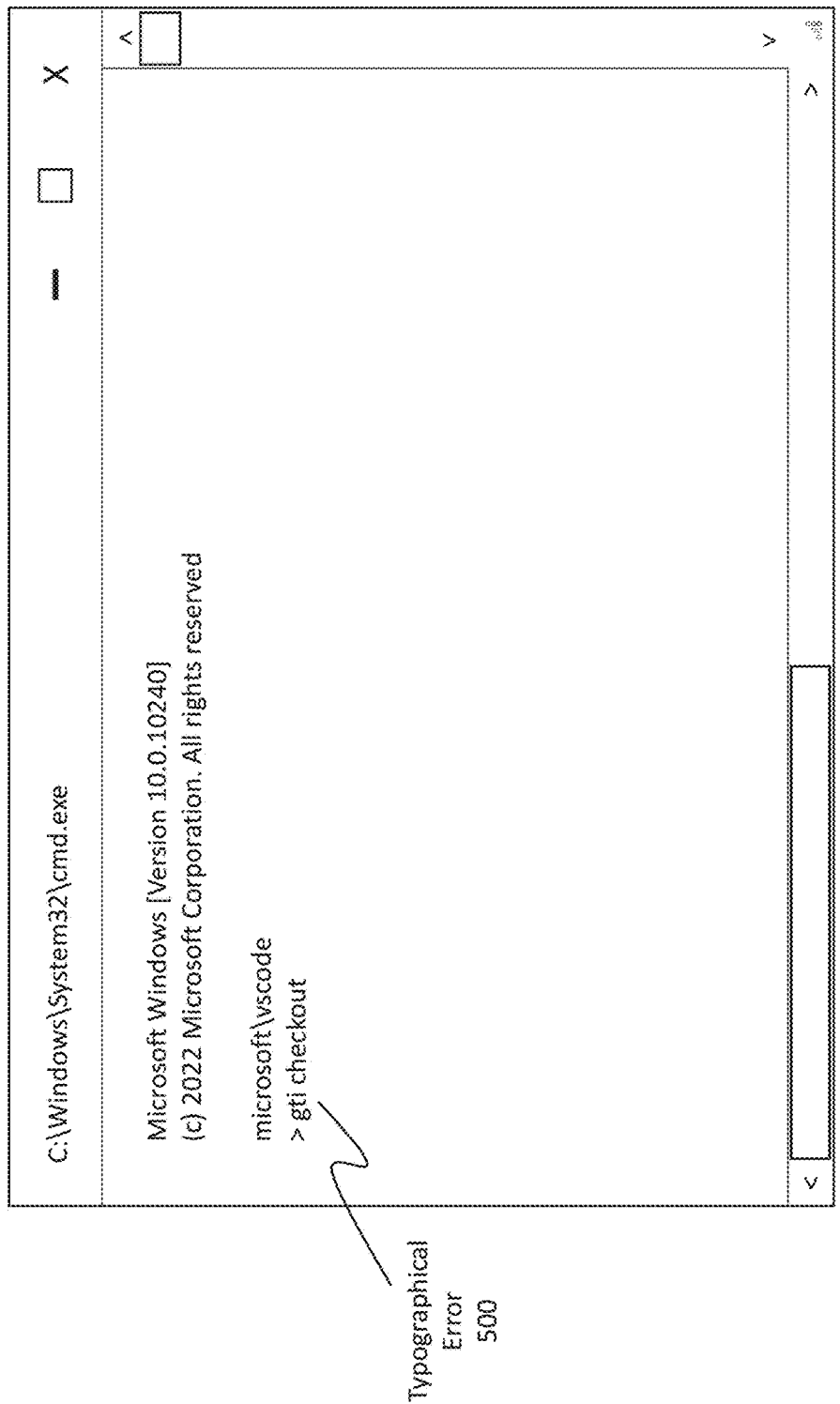
FIG. 5 illustrates an example scenario where a command has been mistyped in the CLI.

FIG. 5 illustrates an example scenario where the user has mistyped a command, as shown by the typographical error 500. The embodiments are able to detect an event 505 based on that typographical error 500. For instance, the embodiments can detect an event where the user is contemporaously entering incorrect commands and/or the embodiments can detect an event where output is displayed in response to the incorrectly entered command. Typically, it is the case that the embodiments are triggered in response to the output being displayed. However, the embodiments can be triggered and the principles can be employed even during a time when output has not yet been displayed, such as when the user is actually typing the command in the CLI.

FIG. 6 shows an example output 600 that can be generated in response to the mistyped command that was shown in FIG. 5. Here, the shell generated the output 600 to inform the user that "gti" is not a command that is recognized.

Figure 7:
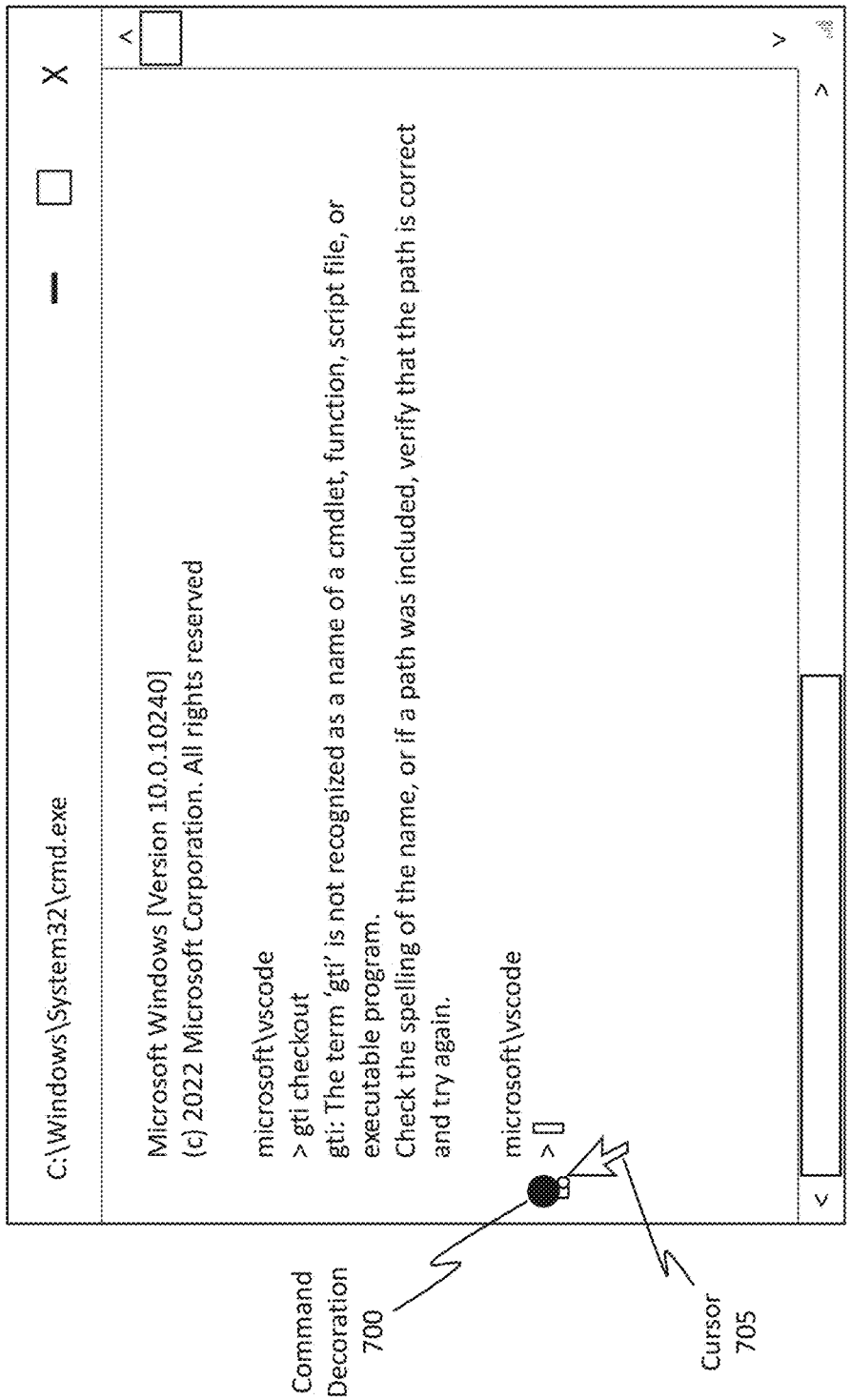
FIG. 7 illustrates an example command decoration that can be displayed in the CLI.

In accordance with the disclosed principles, the embodiments are able to detect various events, such as when certain output has been displayed (e.g., output that informs the user that the entered command was not correct or not recognized by the shell). Other events can also be detected as well, such as when the user is currently using an incorrect directory or when a computer feature (e.g., perhaps a port) is currently operating but it should be terminated, and so on without limit. In response to such events, the embodiments are able to display, within the CLI, a command decoration, as shown in FIG. 7 by the command decoration 700.

In this example, the command decoration 700 is displayed to the left of the next available line where text can be entered in the CLI. It should be noted, however, that the command decoration 700 can actually be displayed anywhere within the CLI. For instance, the command decoration 700 can be displayed to the right of the command prompt icon (e.g., the small vertical rectangle in FIG. 7). The command decoration 700 can also be displayed next to the line that included the incorrect command (e.g., the line reading: "gti checkout").

The command decoration 700 is currently displayed in the form of a lightbulb. One will appreciate how other forms can be used, however. For instance, the command decoration 700 can be displayed in the form of an ellipsis, a circle, square, triangle, or any other shape, polygon, or customized icon.

In some cases, the color of the command decoration 700 can be different than the color of the text displayed within the CLI. For example, it is often the case that the background of the CLI is white and the text is black. It is also often the case that the background of the CLI is black and the text is white. The color of the command decoration 700 can be any other color (e.g., red, green, blue, etc. without limit). The background and text colors of the CLI can often be changed. Regardless of the color of the background and text, the embodiments can configure the color of the command decoration 700 to be different than the colors of the background and the text.

In some cases, the command decoration 700 can be at least partially transparent. For instance, if the command decoration 700 is positioned so as to overlap or cover some text in the CLI, the command decoration 700 can be configured to be at least partially transparent so a user can still see the underlying text.

In some cases, the command decoration 700 can also be configured to blink in order to catch the user's attention. In some cases, the command decoration 700 can also be formatted to include a pattern or texture for its appearance.

A user can manipulate a cursor 705 in order to select the command decoration 700. That is, the command decoration 700 is selectable within the CLI. The result of selecting the command decoration 700 will be discussed momentarily.

Figure 8:
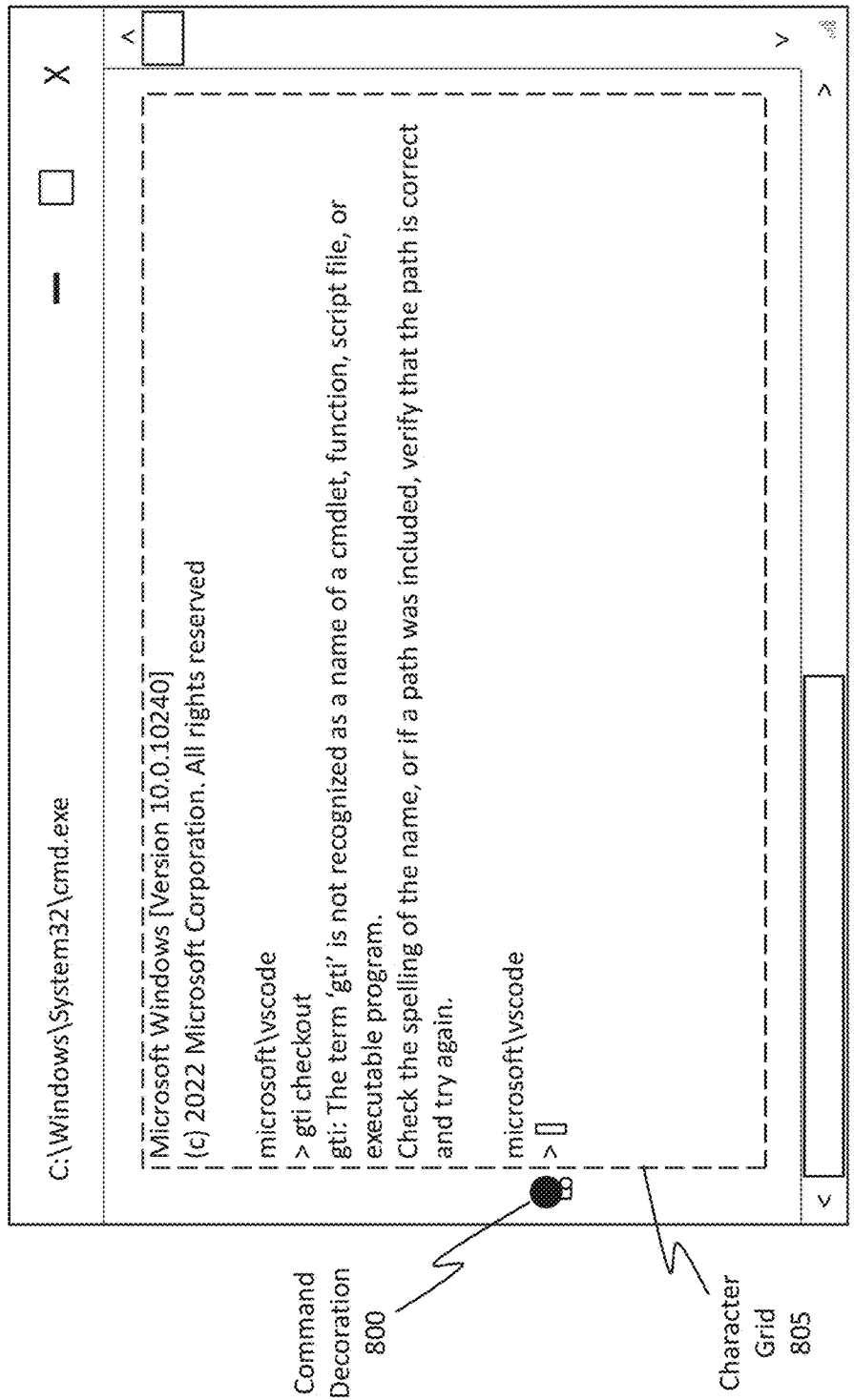
FIG. 8 illustrates how the command decoration can be displayed outside of a character grid of the CLI and in-line with the next line where text can be entered in the CLI.

FIG. 8 shows how, in some implementations, the command decoration 800 is displayed within the window of the CLI but is displayed outside of the character grid 805 of the CLI and can be displayed proximately to a line in the CLI where new text can be entered. The character grid 805 is the portion of the CLI's window where text can be entered or displayed. In some example implementations, the command decoration 800 is displayed proximate to the character grid 805 (but outside of it) while still within the window of the CLI. In other example implementations, the command decoration 800 is displayed within the character grid 805, as mentioned previously. In some instances, the command decoration 800 can even be displayed as overlapping some text in the character grid 805. That is, the menu can be displayed as overlapping at least some text that is already displayed in the CLI.

Figure 9:
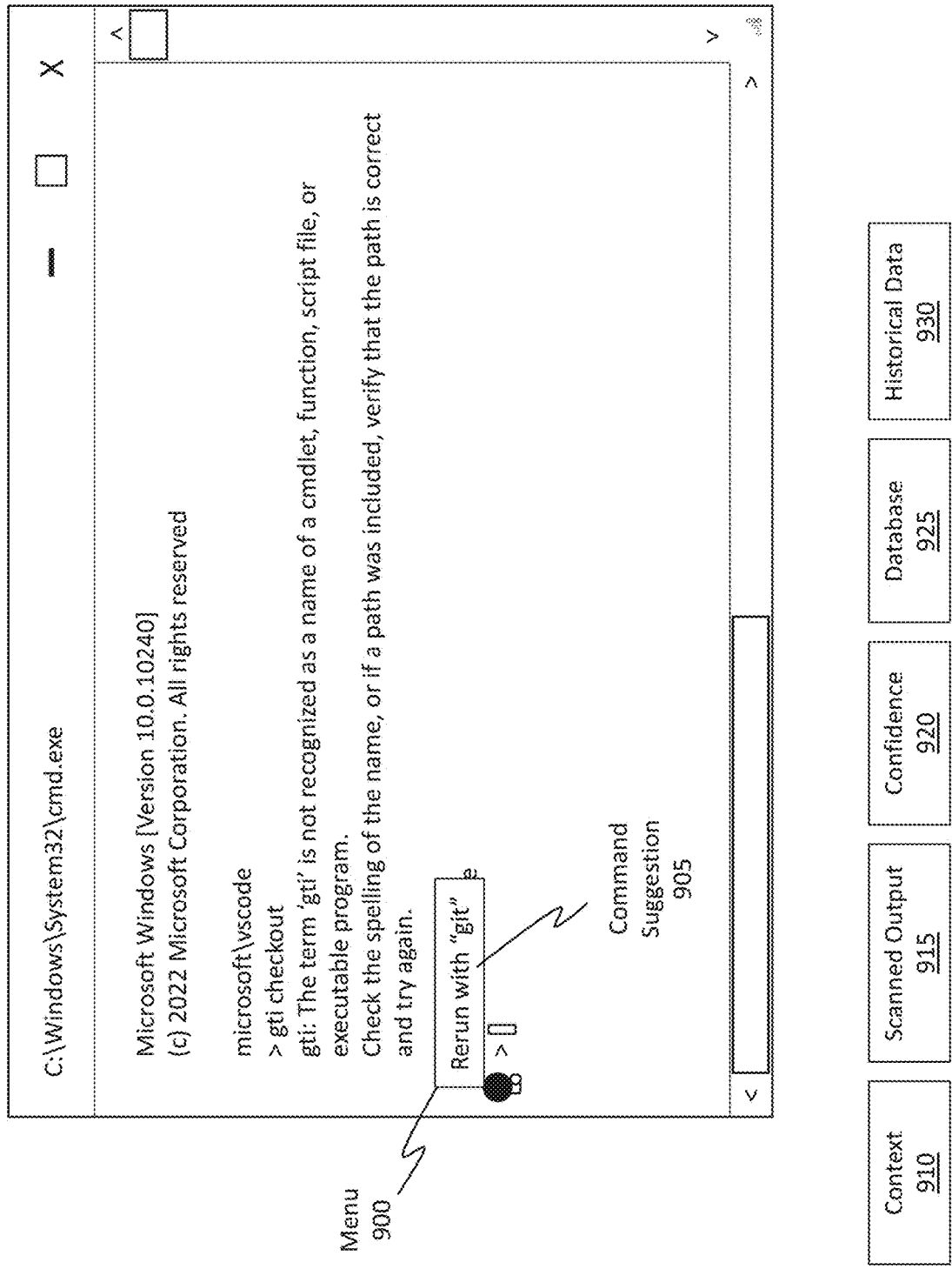
FIG. 9 illustrates how, when the command decoration is selected, a resulting menu can be displayed, where this menu includes one or more command suggestions.

FIG. 9 shows the results of selecting the command decoration. Specifically, in response to selecting the command decoration 700 of FIG. 7 using the cursor 705, the embodiments are triggered to display a menu 900.

Menu 900 is configured to display one or more command suggestions, such as the command suggestion 905. The command suggestion 905 is generated based on a context 910 that is identified by the embodiments. In the example scenario shown in FIG. 9, the embodiments scanned the output that was previously generated (e.g., output 600 of FIG. 6), as shown by scanned output 915. The embodiments can scan the entire output or, alternatively, can scan select portions of the output. For instance, the embodiments can scan a selected number of lines at the beginning of the output (e.g., perhaps the first 1, 2, 3, 4, 5, or more lines at the beginning of the output). Additionally, or alternatively, the embodiments can scan a selected number of lines at the end of the output (e.g., perhaps the last 1, 2, 3, 4, 5, or more lines at the end of the output). Additionally, the embodiments can review the command that was previously entered. In some cases, the style or the content of the output can be analyzed to determine what the output represents (e.g., is the output representative of an error message).

Based on the previous command and/or based on the scanned output 915, where all of that information constitutes "context," the embodiments can generate the command suggestion 905. In some cases, multiple command suggestions can optionally be generated and displayed in the menu 900. In some cases, each generated command suggestion is ranked or is provided with a confidence 920 as to the likelihood that the user originally intended to use the command suggestion. In some cases, the command suggestion with the highest confidence 920 can be the only command suggestion that is displayed in the menu 900. In some cases, command suggestions whose confidence levels exceed a predefined threshold can be displayed.

In some example cases, a single command suggestion is displayed in the menu. Here, the single command suggestion can actually be one of a plurality of command suggestions that are generated. Furthermore, in some cases, the single command suggestion is displayed in the menu as a result of the single command suggestion having a highest confidence level as compared to confidence levels of other command suggestions included in the plurality of command suggestions.

In some cases, a database 925 can also be maintained, where the database 925 includes a set of commands. It may be the case that the command decoration and menu 900 are displayed only if the entered command is associated with a command included in the database 925. For instance, in this example scenario, the user mistyped the command "git." It may be the case that "git" is a command included in the database 925, so the embodiments were triggered based on that command being included in the database 925. If the command is not included in the database 925, some embodiments will refrain from displaying the command decoration. In this sense, the command can operate as a filter for determining whether the command decoration is to be displayed. As such, a database can be used to check for typos, where a real command is not mentioned in the output. In other scenarios, the embodiments can search for executables in the user's $PATH environment variable. A "text distance" algorithm can then be used to get the closest match to the command that was meant to be entered.

Accordingly, in some example scenarios, a listing of specific commands can be maintained in a database. When the command that was entered in the CLI is included in the listing of specific commands, then the menu can be displayed. That is, the menu might be displayed only when a specific command included in the listing of specific commands is entered in the CLI. As a consequence, the menu can be refrained from being displayed when a particular command that is not included in the listing of specific commands is entered in the CLI.

In some cases, the command itself can operate as a filter in determining which types of command suggestions are to be displayed. For instance, if the command is a Python command, then the embodiments can filter commands to include only Python-related commands and/or attributes/parameters. Accordingly, in some cases, the command suggestions can be generated based on using the command that was entered in the CLI as a filter. In any event, the embodiments use context in order to generate the command suggestions.

In some cases, the embodiments are able to maintain historical data 930 about a user who is entering the command. As an example, it may be the case that the user frequently mistypes a particular command. The embodiments are able to maintain historical information about a user to determine that user's programming quirks, particularities, or even common coding practices. The embodiments can maintain that information in the historical data 930. Later, when that user is again programming, the historical data 930 can be consulted and can be used to determine which command suggestions to display to the user. An example may be helpful.

Suppose the embodiments have detected that the user repeatedly mistypes the "git" command. This data can be stored among the historical data 930. Later, the embodiments can detect that the user is typing what appears to be a misspelled version of "git." Either while the user is typing or after the mistyped command has been executed, the embodiments can be triggered to display the command decoration with a command suggestion that includes the correctly-typed version of the mistyped command.

As another example, suppose the embodiments frequently detect that the user forgets to change the current working directory. This information can be stored in the historical data 930. The embodiments can then track commands entered in the CLI and determine whether those operations are appropriate for the current working directory or whether the user needs to change the current working directory (in order to properly execute a command) but has forgotten.

Based on the context associated with the commands being entered (e.g., are those commands executable within the current working directory), the embodiments can trigger the display of a command suggestion that includes commands for changing the current working directory. In addition to the change directory command, the command suggestion can also include a repeat of the previous commands, which will now be operable once the directory is changed. Thus, the command suggestion can include a sequence of commands that are executable to perform any number of different actions.

FIG. 10 shows how the command suggestion within the menu is selectable, as shown by selection 1000. Here, the command suggestion included the following language: "Rerun with 'git'". In response to selecting the command suggestion, the embodiments can automatically rerun the command, including any parameters or attributes that were previously typed.

FIG. 11 shows how, in response to the user making the selection 1000 in FIG. 10, the shell automatically executed the command and how the output 1100 is displayed. On the other hand, FIG. 12 shows how some embodiments are configured to simply populate 1200 the CLI with the command suggestion but refrain, at least temporarily, from executing the command. That is, FIG. 11 was focused on a scenario where the command suggestion was automatically executed while FIG. 12 is focused on a scenario where the command suggestion is used to populate the next line in the CLI but is not yet executed until the user hits the Enter key (or perhaps some other hotkey).

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 13:
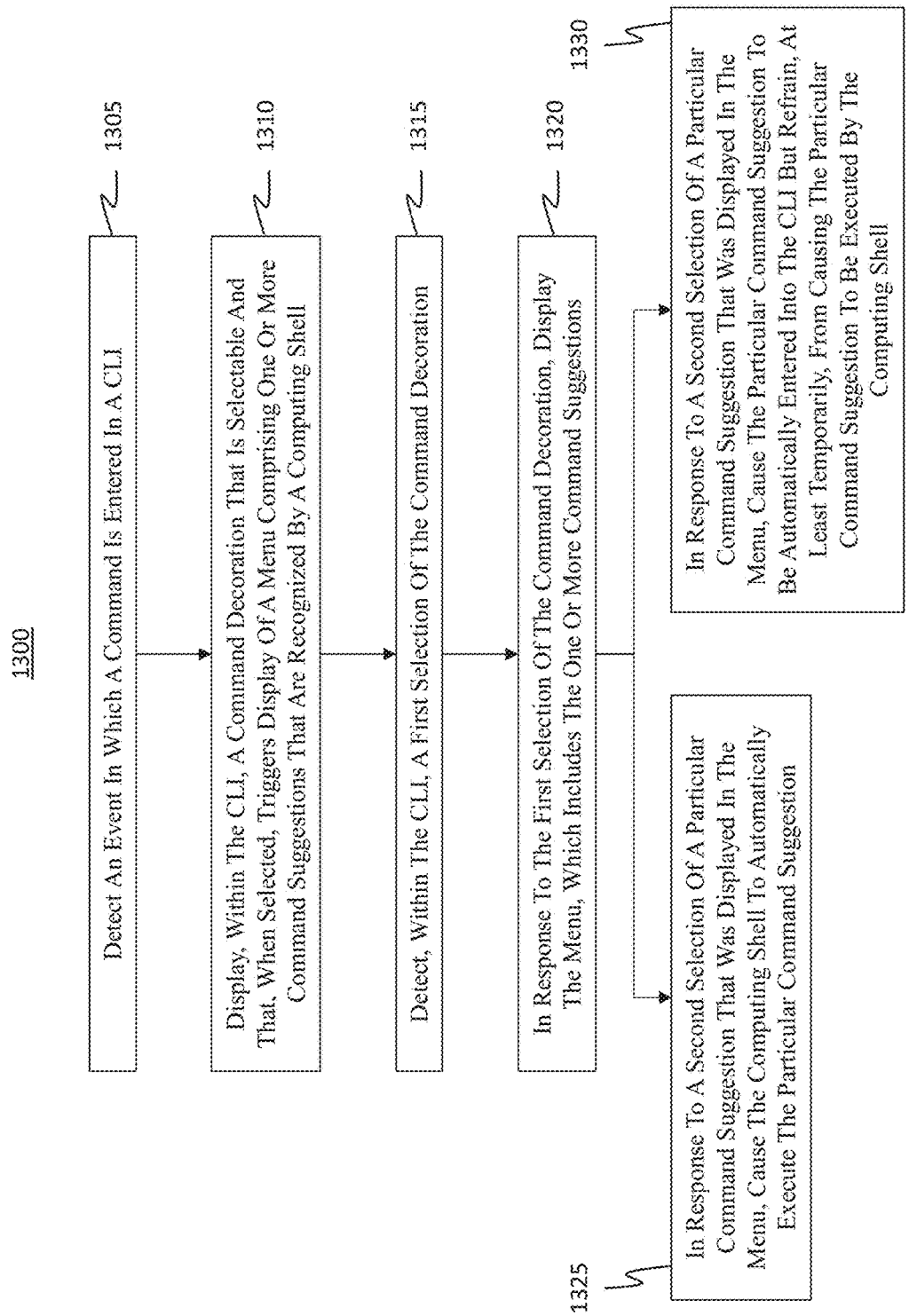
FIG. 13 illustrates a flowchart of an example method for expanding capabilities of a computing shell, which exposes services provided by an operating system (OS) and which is separated from a kernel of the OS, by enabling a command line interface (CLI) of the shell to have context aware capabilities.

Attention will now be directed to FIG. 13, which illustrates a flowchart of an example method 1300 for expanding capabilities of a computing shell, which exposes services provided by an operating system (OS) and which is separated from a kernel of the OS, by enabling a command line interface (CLI) of the shell to have context aware capabilities. Notably, the CLI operates independently relative to an IDE. Further, the CLI is not a traditional text editor. Method 1300 can be implemented within the architecture 100 of FIG. 1. Furthermore, the CLIs from FIGS. 1 through 12 are representative of the CLI described in method 1300.

Method 1300 includes an act (act 1305) of detecting an event in which a command is entered in the CLI. In some cases, the event includes detecting when an output, which is generated in response to the shell attempting to execute the command, is displayed. Thus, the event can include operations conducted before output is displayed and/or can include the display of the output.

After detecting the event, act 1310 includes displaying, within the CLI, a command decoration that is selectable and that, when selected, triggers display of a menu comprising one or more command suggestions that are recognized by the computing shell. Each command suggestion included among the one or more command suggestions is generated based on a context associated with the command.

As discussed previously, the term "context" should be interpreted in an expansive manner. In some cases, the context includes information associated with the command itself (e.g., was the command mistyped, or was the command associated with a particular language, such as Python, or was the command included in a database, etc.). In some cases, the context includes information associated with an output that was generated and displayed in response to an attempt to execute the command (e.g., scanned output). In some cases, the context includes information associated with historical actions performed by the user. That is, the context and command suggestions can be based on historical data associated with a user who entered the command into the CLI.

Accordingly, in some cases, the context can be based on the command itself and/or based on an output that is displayed in response to an attempt by the computing shell to execute the command. Optionally, some, but not necessarily all, of the output can be scanned to generate the context on which the command suggestions are generated.

Act 1315 includes detecting, within the CLI, a first selection of the command decoration. For example, with reference to FIG. 7, the user is using the cursor 705 to make a selection of the command decoration 700.

In response to the first selection of the command decoration, act 1320 includes displaying the menu, which includes the one or more command suggestions. Each command suggestion included among the one or more command suggestions is selectable within the menu. For instance, the cursor can be used to make the selection. In some example scenarios, such as when the command suggestion is selected, that selection can optionally result in the computing shell automatically executing the selected command suggestion.

In some embodiments, the particular command suggestion includes at least one of: (i) a corrected version of the command that was originally entered in the CLI, where the corrected version corrects a typographical error that was included in the command that was originally entered in the CLI, or (ii) a change directory set of commands that cause the shell to change a working directory and that then subsequently reruns the command that was originally entered in the CLI such that the change directory set of commands causes multiple commands to be executed automatically, or (iii) a termination set of commands that cause a termination event to occur and that then subsequently reruns the command that was originally entered in the CLI such that the termination set of commands also causes multiple commands to be executed automatically.

In one example scenario, the command that was entered in the CLI was not recognized by the computing shell. Optionally, the command was not recognized as a result of the command including a typographical error. Optionally, the command was not recognized as a result of the command being associated with an incorrect directory. In other words, the command will not work within the environment provided by the current directory but may work within an environment provided by a different directory. In some cases, the command that was entered in the CLI was recognized by the computing shell, but the command decoration is displayed despite the command being recognized by the computing shell. As an example, the entered command (or attributes) may have been executable, but the wrong command may have been used or the command was executed within the wrong directory or using the wrong port, but the command was nevertheless still executable. The embodiments can detect that perhaps the command should have been executed using an alternative set of conditions (e.g., ports, directories, etc.).

In response to a second selection of a particular command suggestion that was displayed in the menu, act 1325 includes causing the computing shell to automatically execute the particular command suggestion. As an alternative to act 1325, act 1330 includes causing the particular command suggestion to be automatically entered into the CLI. Here, however, the shell refrains, at least temporarily, from causing the particular command suggestion to be executed by the computing shell (e.g., at least until the user selects the Enter key).

Accordingly, the disclosed embodiments bring about numerous benefits and advantages to coding within the confines of a terminal/CLI. The embodiments can educate users, can help improve those users' coding practices, and can even improve the underlying operations of the computer system by potentially avoiding wasting resources by attempting to execute commands that should not be executed.

Example Computer/Computer Systems

Figure 14:
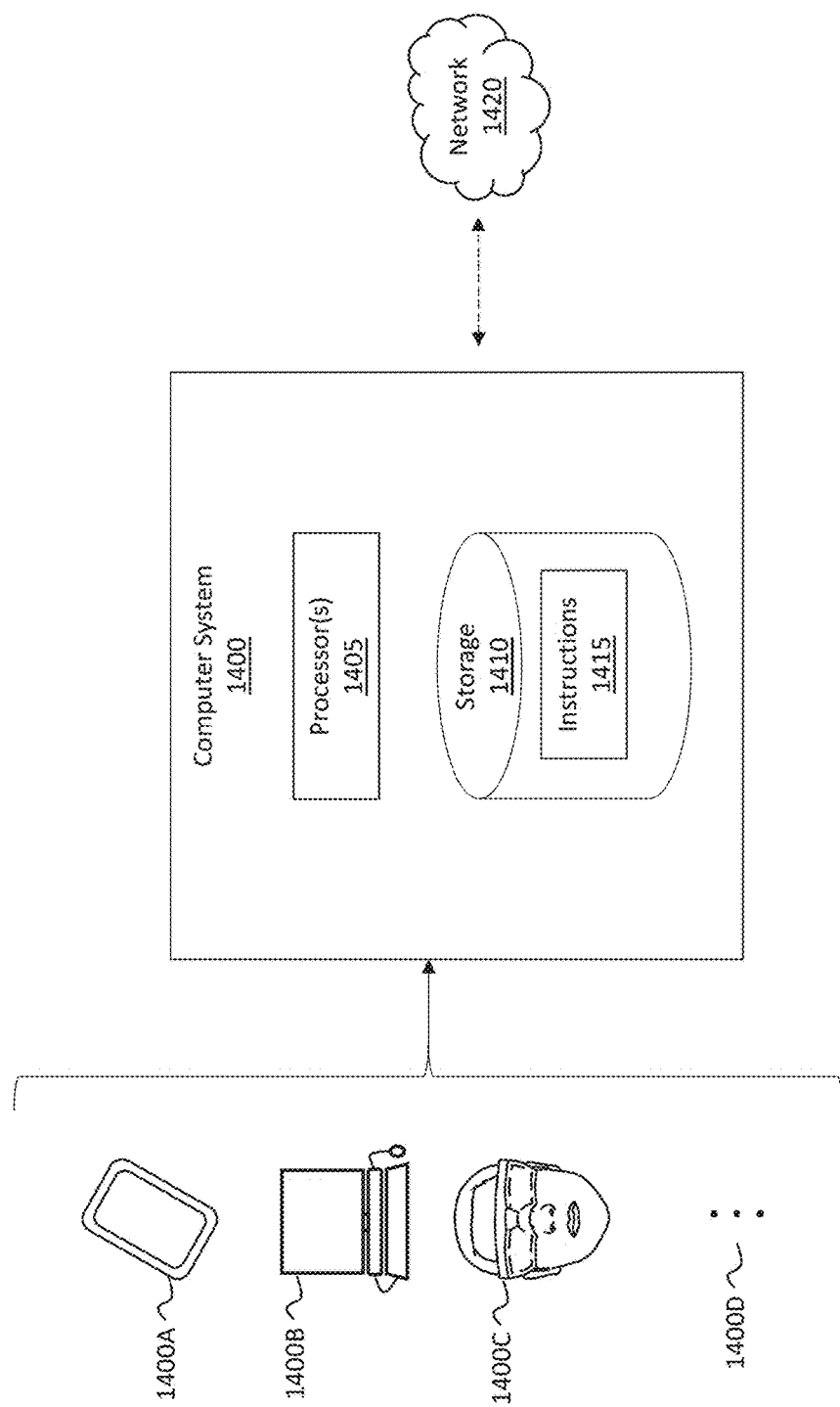
FIG. 14 illustrates an example computer system capable of performing any of the disclosed operations.

Attention will now be directed to FIG. 14 which illustrates an example computer system 1400 that may include and/or be used to perform any of the operations described herein. Computer system 1400 may take various different forms. For example, computer system 1400 may be embodied as a tablet 1400A, a desktop or a laptop 1400B, a wearable device 1400C, a mobile device, or any other standalone device as represented by the ellipsis 1400D. Computer system 1400 may also be a distributed system that includes one or more connected computing components/devices that are in communication with computer system 1400.

In its most basic configuration, computer system 1400 includes various different components. FIG. 14 shows that computer system 1400 includes one or more processor(s) 1405 (aka a "hardware processing unit") and storage 1410.

Regarding the processor(s) 1405, it will be appreciated that the functionality described herein can be performed, at least in part, by one or more hardware logic components (e.g., the processor(s) 1405). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," or "engine" can refer to hardware processing units or to software objects, routines, or methods that may be executed on computer system 1400. The different components, modules, engines, and services described herein may be implemented as objects or processors that execute on computer system 1400 (e.g. as separate threads).

Storage 1410 may be physical system memory, which may be volatile, non-volatile, or some combination of the two. The term "memory" may also be used herein to refer to non-volatile mass storage such as physical storage media. If computer system 1400 is distributed, the processing, memory, and/or storage capability may be distributed as well.

Storage 1410 is shown as including executable instructions 1415. The executable instructions 1415 represent instructions that are executable by the processor(s) 1405 of computer system 1400 to perform the disclosed operations, such as those described in the various methods.

The disclosed embodiments may comprise or utilize a special-purpose or general-purpose computer including computer hardware, such as, for example, one or more processors (such as processor(s) 1405) and system memory (such as storage 1410), as discussed in greater detail below.

Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1400 may also be connected (via a wired or wireless connection) to external sensors (e.g., one or more remote cameras) or devices via a network 1420. For example, computer system 1400 can communicate with any number devices or cloud services to obtain or process data. In some cases, network 1420 may itself be a cloud network. Furthermore, computer system 1400 may also be connected through one or more wired or wireless networks to remote/separate computer systems(s) that are configured to perform any of the processing described with regard to computer system 1400.

A "network," like network 1420, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1400 will include one or more communication channels that are used to communicate with the network 1420. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for enabling a command line interface (CLI) of a shell to have context aware capabilities, said method comprising:
   detecting an event in which a command is entered in the CLI;
   displaying, proximately to a line in the CLI where new text is enterable in a character grid of the CLI and in a border region that is outside of the character grid, a command decoration that is selectable and that, when selected, triggers display of a menu comprising a command suggestion, wherein:
      the command suggestion is generated based on the command,
      the border region is an outer peripheral region of a window of the character grid of the CLI, and
      an entirety of the command decoration is displayed within the border region;
   detecting selection of the command decoration;
   displaying the menu comprising the command suggestion; and
   in response to selection of the command suggestion, causing the shell to execute the command suggestion.

2. The method of claim 1, wherein the command decoration is displayed after the event is detected.

3. The method of claim 1, wherein selection of the command decoration is performed using a cursor.

4. The method of claim 1, wherein the CLI of the shell is a Windows operation system command prompt.

5. The method of claim 1, wherein the CLI of the shell is an iOS terminal.

6. The method of claim 1, wherein the CLI of the shell allows for the new text to be entered only at a tail end of the CLI.

7. The method of claim 1, wherein the CLI of the shell is not a text editor.

8. The method of claim 1, wherein the command suggestion includes a change directory command.

9. The method of claim 1, wherein the command suggestion includes a termination command.

10. The method of claim 1, wherein the command suggestion is a single command suggestion displayed in the menu.

11. A computer system comprising:
one or more processors; and
one or more hardware storage devices that store instructions that are executable by the one or more processors to cause the computer system to:
  detect an event in which a command is entered in a command line interface (CLI) of a shell;
  display, proximately to a line in the CLI where new text is enterable in a character grid of the CLI and in a border region that is outside of the character grid, a command decoration that is selectable and that, when selected, triggers display of a menu comprising a command suggestion, wherein:
    the command suggestion is generated based on the command,
    the border region is an outer peripheral region of a window of the character grid of the CLI, and
    an entirety of the command decoration is displayed within the border region;
  detect selection of the command decoration;
  display the menu comprising the command suggestion; and
  in response to selection of the command suggestion, cause the shell to execute the command suggestion.

12. The computer system of claim 11, wherein the menu displays a single command suggestion, which is the command suggestion.

13. The computer system of claim 11, wherein the command entered in the CLI is not recognized by the shell.

14. The computer system of claim 11, wherein the command entered in the CLI is recognized by the shell.

15. The computer system of claim 11, wherein the command suggestion is generated based on a determined context.

16. The computer system of claim 15, wherein the determined context is a historical context of a user who entered the command.

17. The computer system of claim 15, wherein the determined context is a command context of the command.

18. The computer system of claim 11, wherein the menu includes a plurality of command suggestions.

19. The computer system of claim 11, wherein the CLI operates independently relative to an integration development environment (IDE).

20. A computer system comprising:
one or more processors; and
one or more hardware storage devices that store instructions that are executable by the one or more processors to cause the computer system to:
  detect an event in which a command is entered in a command line interface (CLI) of a shell;
  display, proximately to a line in the CLI where new text is enterable in a character grid of the CLI and in a border region that is outside of the character grid, a command decoration that is selectable and that, when selected, triggers display of a menu comprising a command suggestion, wherein:
    the command suggestion is generated based on the command,
    the border region is an outer peripheral region of a window of the character grid of the CLI, and
    an entirety of the command decoration is displayed within the border region;
  detect selection of the command decoration;
  display the menu comprising the command suggestion; and
  in response to selection of the command suggestion, cause the command suggestion to be automatically entered into the CLI while refraining, at least temporarily, from executing the command suggestion.

* * * * *